United States Patent
Manur et al.

(10) Patent No.: US 11,088,939 B1
(45) Date of Patent: Aug. 10, 2021

(54) REDUCING OPEN SHORTEST PATH FIRST PROTOCOL LINK FLAP

(71) Applicant: Juniper Networks, Inc., Sunnyvale, CA (US)

(72) Inventors: Rajesh Shetty Manur, Bangalore (IN); Shraddha Hegde, Bangalore (IN); Abhishek Chakraborty, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 127 days.

(21) Appl. No.: 16/166,571

(22) Filed: Oct. 22, 2018

(51) Int. Cl.
*H04L 12/721* (2013.01)
*H04L 12/751* (2013.01)
*H04L 12/801* (2013.01)

(52) U.S. Cl.
CPC .................... *H04L 45/124* (2013.01)

(58) Field of Classification Search
CPC ....... H04L 45/124; H04L 45/26; H04L 45/12; H04L 12/56
USPC ........................................................ 370/252
See application file for complete search history.

(56) References Cited

U.S. PATENT DOCUMENTS

| 9,755,962 | B2* | 9/2017 | K A | H04L 45/32 |
| 2007/0245034 | A1* | 10/2007 | Retana | H04L 45/54 709/238 |
| 2011/0103228 | A1* | 5/2011 | Sheth | H04L 45/66 370/238 |
| 2016/0036630 | A1* | 2/2016 | Luo | H04L 41/082 370/244 |
| 2017/0344594 | A1* | 11/2017 | Lindem, III | G06F 16/275 |

* cited by examiner

*Primary Examiner* — Yemane Mesfin
*Assistant Examiner* — Intekhaab A Siddiquee
(74) *Attorney, Agent, or Firm* — Harrity & Harrity, LLP

(57) ABSTRACT

A first network device may determine that a link-state database (LSDB), associated with the first network device, includes a first link-state advertisement (LSA) instance associated with a second network device. The first network device may determine that the first network device has not received a second LSA instance, associated with the second network device, that does not include information identifying a fully adjacent link between the second network device and the first network device. The first network device may receive the second LSA instance associated with the second network device and may transmit, to the second network device, a third LSA instance, associated with the first network device, that includes the information identifying the fully adjacent link between the second network device and the first network device, only after the second LSA instance is received.

20 Claims, 8 Drawing Sheets

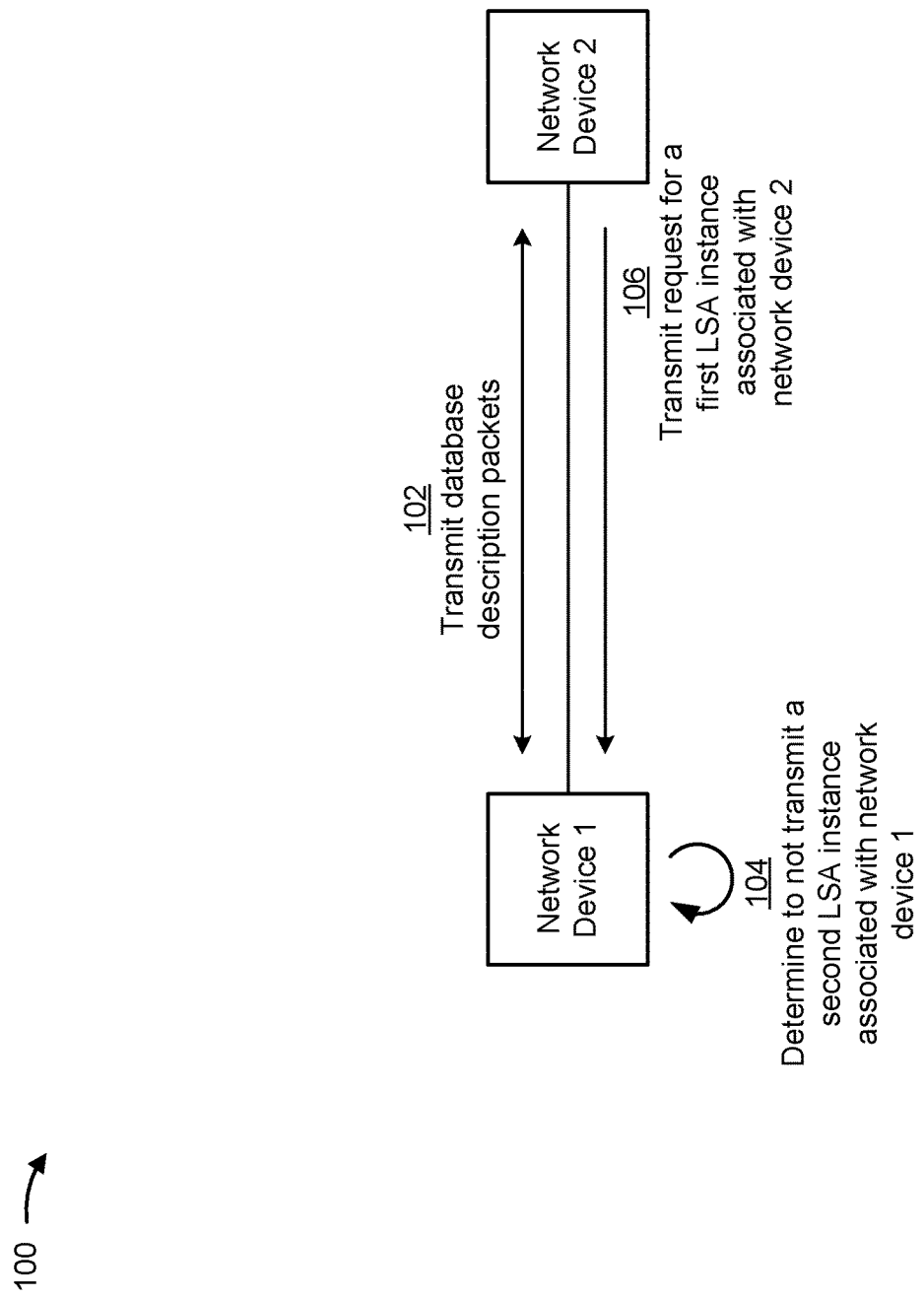

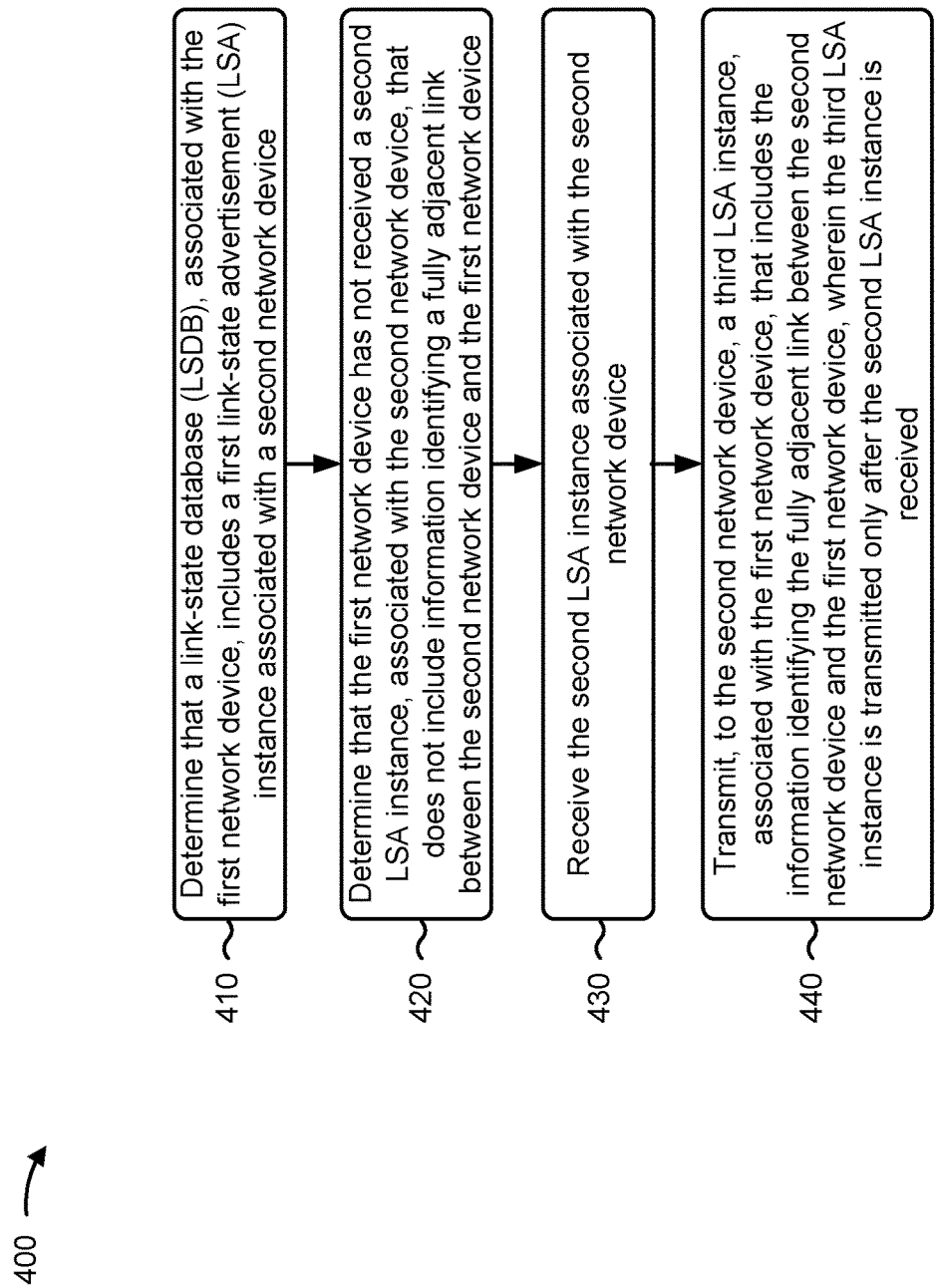

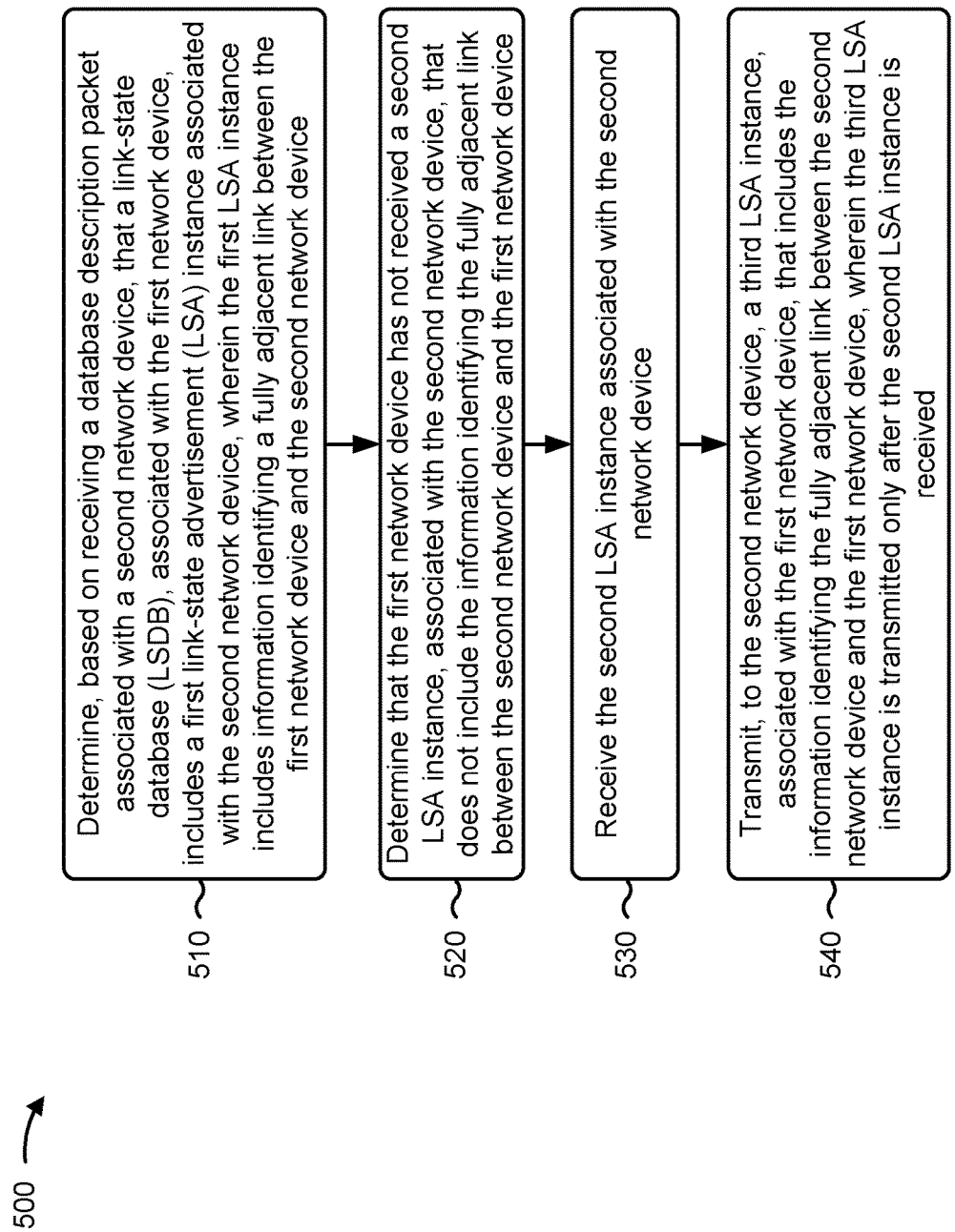

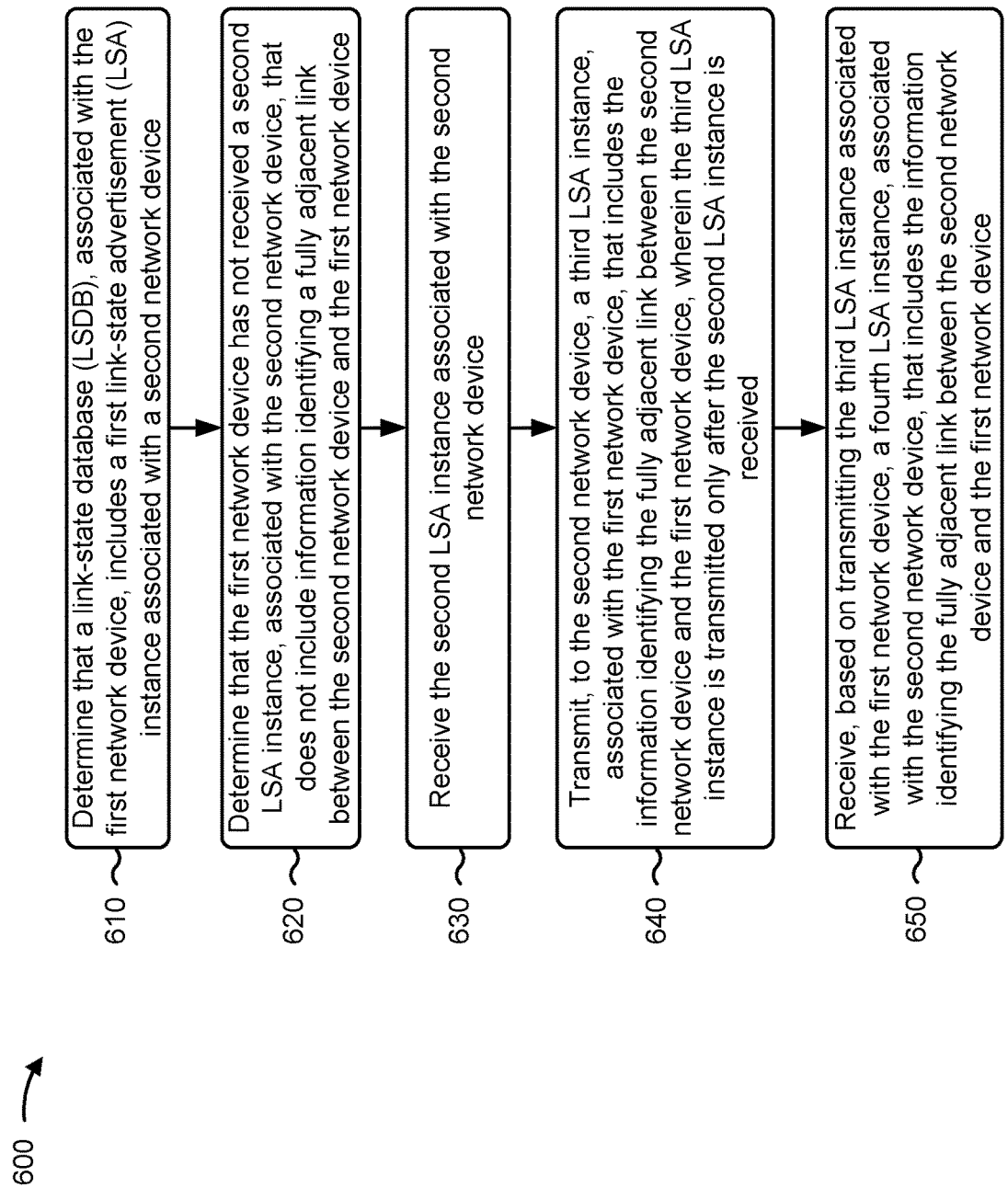

REDUCING OPEN SHORTEST PATH FIRST PROTOCOL LINK FLAP

BACKGROUND

The open shortest path first (OSPF) protocol is a link-state routing protocol. A network device may use the OSPF protocol to calculate one or more shortest routes in a network for routing and/or forwarding packets in the network.

SUMMARY

According to some implementations, a first network device may include one or more memories, and one or more processors to determine that a link-state database (LSDB), associated with the first network device, includes a first link-state advertisement (LSA) instance associated with a second network device. The one or more processors may determine that the first network device has not received a second LSA instance, associated with the second network device, that does not include information identifying a fully adjacent link between the second network device and the first network device. The one or more processors may receive the second LSA instance associated with the second network device. The one or more processor may transmit, to the second network device, a third LSA instance, associated with the first network device, that includes the information identifying the fully adjacent link between the second network device and the first network device, wherein the third LSA instance is transmitted only after the second LSA instance is received.

According to some implementations, a non-transitory computer-readable medium may store instructions that include one or more instructions that, when executed by one or more processors of a device, cause the one or more processors to determine, based on receiving a database description packet associated with a second network device, that a link-state database (LSDB), associated with the first network device, includes a first link-state advertisement (LSA) instance associated with the second network device, wherein the first LSA instance includes information identifying a fully adjacent link between the first network device and the second network device. The one or more instructions may cause the one or more processors to determine that the first network device has not received a second LSA instance, associated with the second network device, that does not include the information identifying the fully adjacent link between the second network device and the first network device. The one or more instructions may cause the one or more processors to receive the second LSA instance associated with the second network device. The one or more instructions may cause the one or more processors to transmit, to the second network device, a third LSA instance, associated with the first network device, that includes the information identifying the fully adjacent link between the second network device and the first network device, wherein the third LSA instance is transmitted only after the second LSA instance is received.

According to some implementations, a method may include determining, by a first network device, that a link-state database (LSDB), associated with the first network device, includes a first link-state advertisement (LSA) instance associated with a second network device. The method may include determining, by the first network device, that the first network device has not received a second LSA instance, associated with the second network device, that does not include information identifying a fully adjacent link between the second network device and the first network device. The method may include receiving, at the first network device, the second LSA instance associated with the second network device. The method may include transmitting, by the first network device and to the second network device, a third LSA instance, associated with the first network device, that includes the information identifying the fully adjacent link between the second network device and the first network device, wherein the third LSA instance is transmitted only after the second LSA instance is received. The method may include receiving, at the first network device and based on transmitting the third LSA instance associated with the first network device, a fourth LSA instance, associated with the second network device, that includes the information identifying the fully adjacent link between the second network device and the first network device.

BRIEF DESCRIPTION OF THE DRAWINGS

FIGS. 1A-1C are diagrams of an example implementation described herein.

FIG. 4 is a flow chart of an example process for reducing open shortest path first protocol link flap.

FIG. 5 is a flow chart of an example process for reducing open shortest path first protocol link flap.

FIG. 6 is a flow chart of an example process for reducing open shortest path first protocol link flap.

DETAILED DESCRIPTION

Figure 1B:
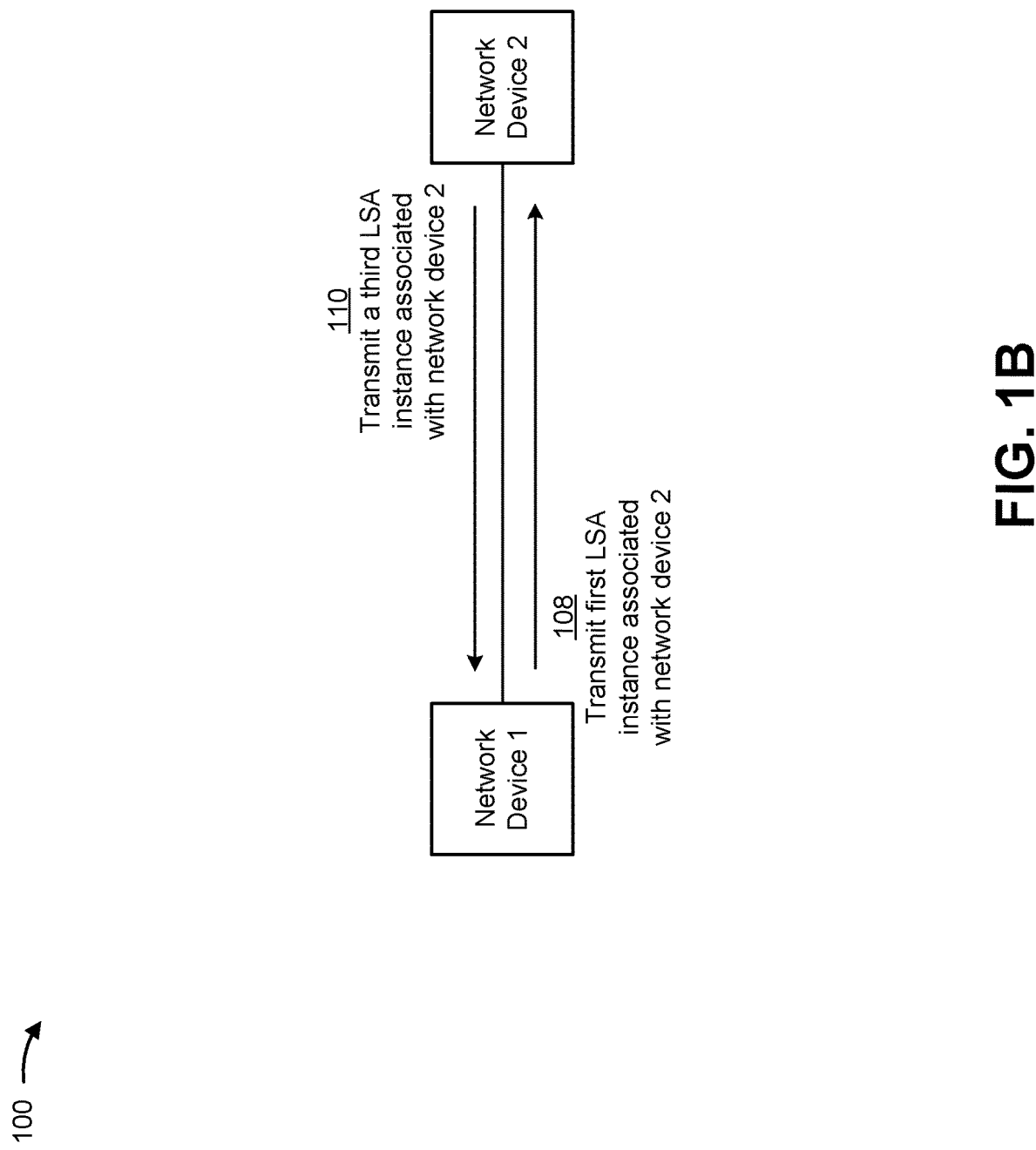

The following detailed description of example implementations refers to the accompanying drawings. The same reference numbers in different drawings may identify the same or similar elements.

In some cases, an OSPF network may include one or more sub-domains, which may be referred to as OSPF areas. A first network device and a second network device that are neighbors in an OSPF area may form a full adjacency. A full adjacency may include a two-way (or bidirectional) adjacency between the first network device and the second network device (e.g., the first network may form a first adjacency with the second network device and the second network device may form a second adjacency with the first network device).

To form a full adjacency, the first network device and the second network device may exchange one or more database description packets. For example, the first network device may transmit a first database description packet to the second network device, and the second network device may transmit a second database description packet to the first network device. The first database description packet, associated with the first network device, may include information specifying the contents of a first link-state database (LSDB) associated with the first network device. Similarly, the second database description packet, associated with the second network device, may include information specifying the contents of a second LSDB associated with the second network device.

The contents of an LSDB may include information identifying one or more link-state advertisement (LSA) instances associated with the network devices included in the OSPF area. An LSA, associated with a particular network device, may include information identifying one or more links that are associated with the particular network device. For example, an LSA, associated with a particular network device, may include information identifying a first link associated with the particular network device, may include information identifying a link type associated with the first link (e.g., a point-to-point link, a virtual link, and/or the like), and/or may include information identifying another network device to which the particular network device is communicatively connected via the first link (e.g., an address associated with the other network device, a port identifier associated with the other network device, an interface associated with the other network device, and/or the like).

In some cases, the contents of the LSDB associated with the first network device, and the contents of the LSDB associated with the second network device, may differ. In such cases, the first network device and the second network device may synchronize the respective LSDBs. To do so, the first network device may transmit, to the second network device, a link-state request packet, that includes a request for one or more LSA instances, included in the LSDB associated with the second network device, that are not included in the LSDB associated with the first network device. The second network device may respond to the link-state request packet by transmitting, to the first network device, the requested one or more LSA instances via a link-state update packet. In this way, the first network device is able to ensure that the LSDB associated with the first network device is up to date with the latest LSAs in the OSPF area. The second network device and the first network device may perform similar actions to ensure that the LSDB associated with the second network device is also up to date with the latest LSAs in the OSPF area.

Once the LSDB associated with the first network device and the LSDB associated with the second network device have been synchronized, the first network device and the second network device may transition to a FULL state, in which the full adjacency between the first network device and the second network device is formed. As a result, the first network device and the second network device may perform one or more shortest path first calculations, based on respective LSDBs, to identify one or more routes through the OSPF area, and may route and/or forward traffic through the OSPF area based on the one or more identified routes.

In some cases, the first network device and the second network device may need to reestablish full adjacency based on the first network device and/or the second network device transitioning out of the FULL state into a DOWN state (e.g., due to the first network device and/or the second network device experiencing a fault, due to a reboot of the first network device and/or the second network device, and/or the like). For example, if the second network device transitions into the DOWN state, the first network device may also transition out of the FULL state into a temporary and/or intermediate state (e.g., a one-way state, an initialize state, and/or the like).

During reestablishment of the full adjacency, the first network device may transition into the FULL state because the LSDB, associated with the first network device, already includes the LSA associated with the second network device, which includes information identifying a fully adjacent link between the first network device and the second network device. However, since the second network device transitioned into the DOWN state, the link between the first network device and the second network device is no longer in place. Accordingly, when the first network device and the second network device exchange database description packets, the second network device may identify the LSA instance, associated with the second network device, identified in the database description packet transmitted by the first network device, may determine that the LSDB associated with the second network device does not include the LSA instance associated with the second network device, and may accordingly transmit, to the first network device, a link-state request packet that includes a request for the LSA instance associated with the second network device. The second network device may receive the LSA instance associated with the second network device, and may determine that the LSA instance, associated with the second network device, includes the information identifying the fully adjacent link between the first network device and the second network device, and may transmit, to the first network device, an updated LSA instance associated with the second network device. The updated LSA instance associated with the second network device may not include the information identifying the fully adjacent link between the first network device and the second network device.

The first network device may receive the updated LSA instance associated with the second network device, may determine that a sequence identifier (e.g., a sequence value and/or the like), identified in the updated LSA instance, indicates that the updated LSA instance is more recent relative to the LSA instance, associated with the second network device, identified in the LSDB associated with the first network device, and accordingly may transition out of the FULL state and into a LOADING state (e.g., an OSPF state in which the first network device is to synchronize the LSDB associated with the first network device), so that the first network device can update the LSDB, associated with the first network device, to include the updated LSA instance associated with the second network device. The first network device may transition back into the FULL state once the first network device and the second network device complete LSDB synchronization.

The repeated transition of the first network device in and out of the FULL state may be referred to as a link flap. The link flap may cause other network devices in the OSPF area to repeatedly perform shortest path first calculations (e.g., based on the first network device being available in the OSPF area and based on the first network device being unavailable in the OSPF area), which causes an increased consumption of networking resources, processing resources, and/or memory resources to perform the repeated shortest past first calculations. Moreover, when the first network device transitions from the FULL state to the LOADING state, the first network device drops network traffic during the transition, which decreases the availability of the first network device, decreases the reliability of the first network device, and causes the other network devices in the OSPF area to consume additional networking resources, processing resources, and/or memory resources to retransmit the dropped traffic. In addition, the link flap may cause other protocols, executing on the first network device and the second network device, that rely on OSPF protocol (e.g., border gateway protocol (BGP), virtual router redundancy protocol (VRRP), and/or the like) to also experience interruptions, which causes further churn of network resources in the OSPF area.

Some implementations described herein provide a network device that is capable of reducing and/or preventing link flap in an OSPF area. The network device may determine that a link-state database (LSDB), associated with the network device, includes a first link-state advertisement (LSA) instance associated with another network device. The network device may determine that the first network device has not received a second LSA instance, associated with the other network device, that does not include information identifying a fully adjacent link between the other network device and the network device. The network device may receive the second LSA instance associated with the other network device and may transmit, to the other network device, a third LSA instance, associated with the network device, that includes the information identifying the fully adjacent link between the other network device and the network device, only after the second LSA instance is received.

In this way, the first network device delays advertising full adjacency in the OSPF area until after receiving an updated LSA instance from the second network device. This reduces and/or prevents link flap (e.g., the repeated transition of the first network device in and out of the FULL state), which prevents other network devices in the OSPF area from repeatedly performing shortest path first calculations, which in turn prevents the consumption of networking resources, processing resources, and/or memory resources that would have otherwise been expended on performing repeated shortest past first calculations due to a reboot of the second network device. Moreover, this reduces the amount of traffic that is dropped at the first network device due to link flap, which increases the availability of the first network device, increases the reliability of the first network device, and reduces and/or prevents other network devices in the OSPF area from consuming additional networking resources, processing resources, and/or memory resources that would have otherwise been expended on retransmitting dropped traffic. In addition, this reduces and/or prevents link flap from causing other protocols, executing on the first network device and the second network device, that rely on OSPF protocol (e.g., border gateway protocol (BGP), virtual router redundancy protocol (VRRP), and/or the like) from experiencing interruptions, which reduces churn of network resources in the OSPF area.

Figure 1C:
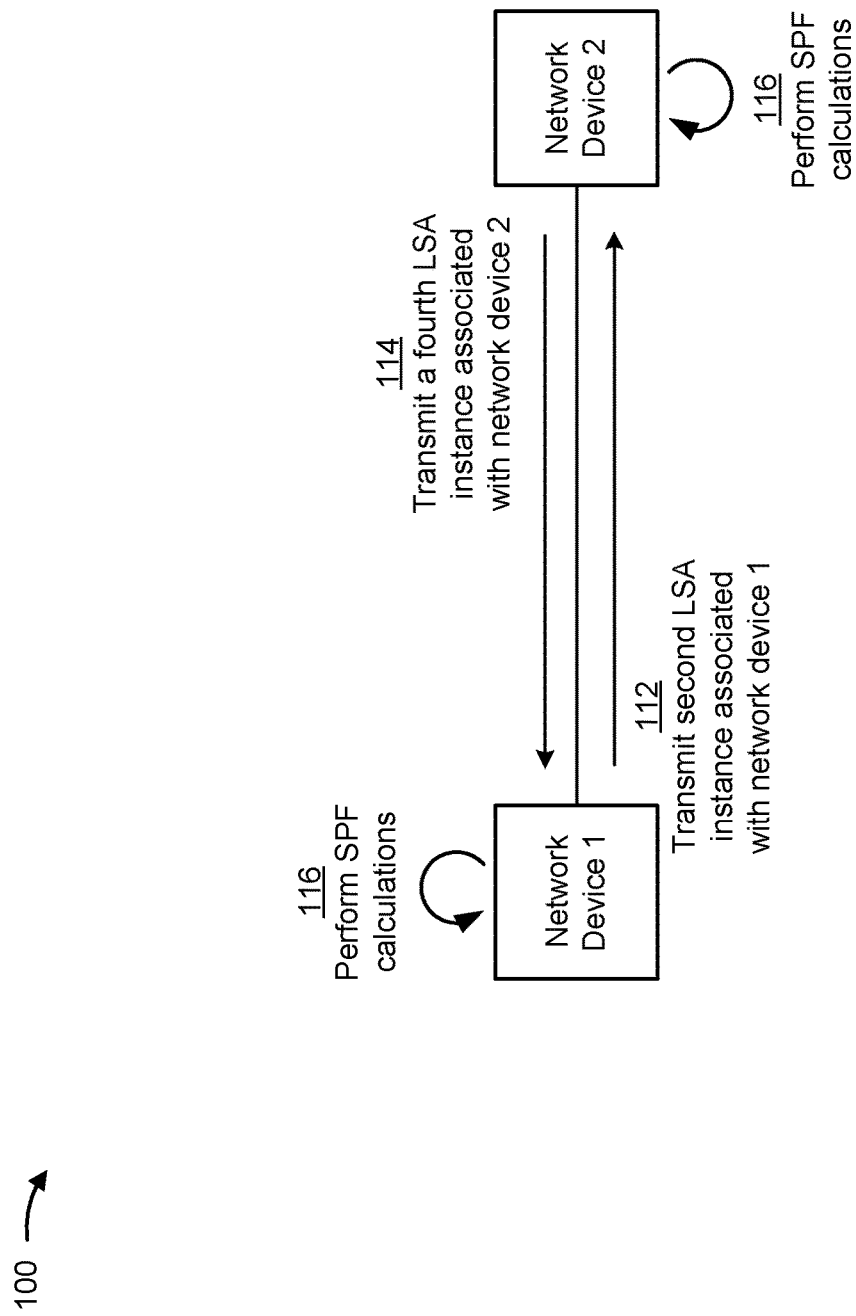

FIGS. 1A-1C are diagrams of an example implementation 100 described herein. As shown in FIGS. 1A-1C, example implementation 100 may include a plurality of network devices, such as network device 1, network device 2, and/or the like. Each of the plurality of network devices may include one or more types of network devices, such as a router, a gateway, a switch, a bridge, a wireless access point, a base station, and/or the like. In some implementations, network device 1 and network device 2 may be included in the same OSPF area. The OSPF area may be included in a network, such as a cellular network, a local area network (LAN), a core network, an access network, a wide area network (WAN) such as the Internet, a cloud network, and/or the like.

In example implementation 100, network device 1 and network device 2 may be communicatively connected via a fully adjacent link. Network device 2 may experience a fault, may receive an instruction, and/or the like, and may reboot or reset as a result. The reboot of network device 2 may cause network device 1 to transition to a temporary and/or intermediate state (e.g., a one-way state), and may cause network device 2 to transition to a DOWN state. Accordingly, network device 1 and network device 2 may perform one or more actions to reestablish the fully adjacent link.

As shown in FIG. 1A, and by reference number 102, to reestablish the fully adjacent link, network device 2 may transmit a first database description packet to network device 1, and network device 1 may transmit a second database description packet to network device 2. The first database description packet may include information identifying the contents of an LSDB associated with the network device 2. Since network device 2 has been rebooted and is in the DOWN state, the LSDB associated with the network device 2 may not include any LSAs.

Network device 1 may receive the first data description packet, may analyze the information identifying the contents of the LSDB associated with the network device 2, and may determine, based on the contents of the LSDB associated with the network device 2, that an LSDB associated with network device 1 includes a first LSA instance, associated with network device 2, that is not included in the LSDB associated with the network device 2. Network device 2 may determine that, since the first LSA instance is included in the LSDB associated with network device 1 and is not included in the LSDB associated with network device 2, that the first LSA instance is out of date and no longer the latest instance of network device 2's LSA.

Accordingly, and as shown by reference number 104, network device 1 may determine to not transition to the FULL state, and to not transmit, to network device 2 (and/or other network devices in the OSPF area) a second LSA associated with network device 1, until only after network device 1 receives a third LSA instance (e.g., an updated LSA instance) associated with network device 2. In this way, network device 1 does not prematurely transition to the FULL state, and does not prematurely advertise a fully adjacent link between network device 1 and network device 2, until network device 2 has flooded (e.g., multicasted, broadcasted, and/or the like) an updated LSA instance in the OSPF area, which reduces and/or prevents link flap of the link between network device 1 and network device 2.

Based on the above description, network device 1 may generate the second database description packet such that the information identifying the contents of the LSDB associated with the network device 1 does not include the instance of the second LSA associated with network device 1. Network device 2 may receive the second database description packet, and may determine, based on the information identifying the contents of the LSDB associated with the network device 1, that the LSDB associated with network device 2 does not include the first LSA instance associated with network device 2. Accordingly, and as shown by reference number 106, network device 2 may transmit, to network device 1, a link-state request packet that includes a request for the first LSA instance associated with network device 2.

As shown in FIG. 1B, network device 1 may receive the link-state request packet, and may identify the request for the first LSA instance associated with network device 2. As shown by reference number 108, network device 1 may locate, based on identifying the request for the first LSA instance associated with network device 2, the first LSA instance in the LSDB associated with network device 1, may generate a link-state update packet, may incorporate the first LSA instance into the link-state update packet, and may transmit the link-state update packet to network device 2.

Network device 2 may receive the link-state update packet and may identify the first LSA instance associated with network device 2. Network device 2 may analyze the first LSA instance and determine that the first LSA instance includes information identifying a fully adjacent link between network device 1 and network device 2. Since network device 2 has been rebooted, and the fully adjacent link between network device 1 and network device 2 has not yet been reestablished, network device 2 may determine that the first LSA instance includes incorrect and/or out-of-date information. Accordingly, and as shown by reference number 110, network device 2 may generate the third LSA instance (e.g., the updated LSA instance) associated with network device 2, such that the third LSA instance does not include the information identifying the fully adjacent link between network device 1 and network device 2, and may transmit the third LSA instance to network device 1.

As shown in FIG. 1C, and by reference number 112, network device 1 may receive the third LSA instance associated with network device 2, may determine that the third LSA instance is now the latest LSA instance of network device 2, and accordingly may transmit, to network device 2, the second LSA instance associated with network device 1. Network device 1 may determine that the third LSA instance is the latest LSA instance associated with network device 2 based on the sequence identifier associated with the third LSA instance. For example, network device 1 may determine that the sequence identifier, associated with the third LSA instance, indicates that the third LSA instance is newer, more recent, and/or the like, relative to the first LSA instance. As an example, network device 1 may determine that the sequence identifier, associated with the third LSA instance, specifies a value that is greater relative to a value specified by the sequence identifier associated with the first LSA instance.

Network device 1 may determine to transmit the second LSA instance, associated with network device 1, based on determining that the third LSA instance is the latest LSA instance associated with network device 2. As described above, the second LSA instance, associated with network device 1, may include information specifying a fully adjacent link between network device 1 and network device 2. In this way, network device 1 delays transmitting, in the OSPF area, information specifying that a fully adjacent link exists between network device 1 and network device 2 until the latest LSA instance, associated with network device 2, is available in the OSPF area, which reduces and/or prevents link flap of the link between network device 1 and network device 2.

As further shown in FIG. 1C, and as shown by reference number 114, after establishing the fully adjacent link between network device 1 and network device 2, network device 2 may transmit another LSA instance (e.g., a fourth LSA instance) that includes information that specifies the fully adjacent link between network device 1 and network device 2. In this way, the fourth LSA instance, associated with network device 2, becomes the latest LSA instance associated with network device 2. Network device 1 may determine that the fourth LSA instance is the latest LSA instance associated with network device 2 based on the sequence identifier associated with the fourth LSA instance. For example, network device 1 may determine that the sequence identifier, associated with the fourth LSA instance, indicates that the fourth LSA instance is newer, more recent, and/or the like, relative to the third LSA instance. As an example, network device 1 may determine that the sequence identifier, associated with the fourth LSA instance, specifies a value that is greater relative to a value specified by the sequence identifier associated with the third LSA instance. In some implementations, network device 1 may store the fourth LSA instance in the LSDB associated with network device 1, and network device 2 may store the fourth LSA instance in the LSDB associated with network device 2.

As further shown in FIG. 1C, and as shown by reference number 116, once the fully adjacent link between network device 1 and network device 2 has been established, network device 1 and network device 2 may transition back into the FULL state, and may perform SPF calculations based on the information included in the respective LSDBs, and may forward traffic in the OSPF area based on the SPF calculations.

In this way, network device 1 delays advertising full adjacency in the OSPF area until after receiving an updated LSA instance from network device 2. This reduces and/or prevents link flap (e.g., the repeated transition of network device 1 in and out of the FULL state), which prevents other network devices in the OSPF area from repeatedly performing shortest path first calculations, which in turn reduces the consumption of networking resources, processing resources, and/or memory resources that would have otherwise been expended on performing repeated shortest past first calculations due to a reboot of network device 2. Moreover, this reduces the amount of traffic that is dropped at network device 1 due to link flap, which increases the availability of network device 1, increases the reliability of network device 1, and prevents other network devices in the OSPF area from consuming additional networking resources, processing resources, and/or memory resources that would have otherwise been expended on retransmitting the dropped traffic. In addition, this reduces and/or prevents link flap from causing other protocols, executing on the first network device and the second network device, that rely on OSPF protocol (e.g., border gateway protocol (BGP), virtual router redundancy protocol (VRRP), and/or the like) from experiencing interruptions, which reduces churn of network resources in the OSPF area.

As indicated above, FIGS. 1A-1C are provided merely as an example. Other examples may differ from what was described with regard to FIGS. 1A-1C.

Figure 2:
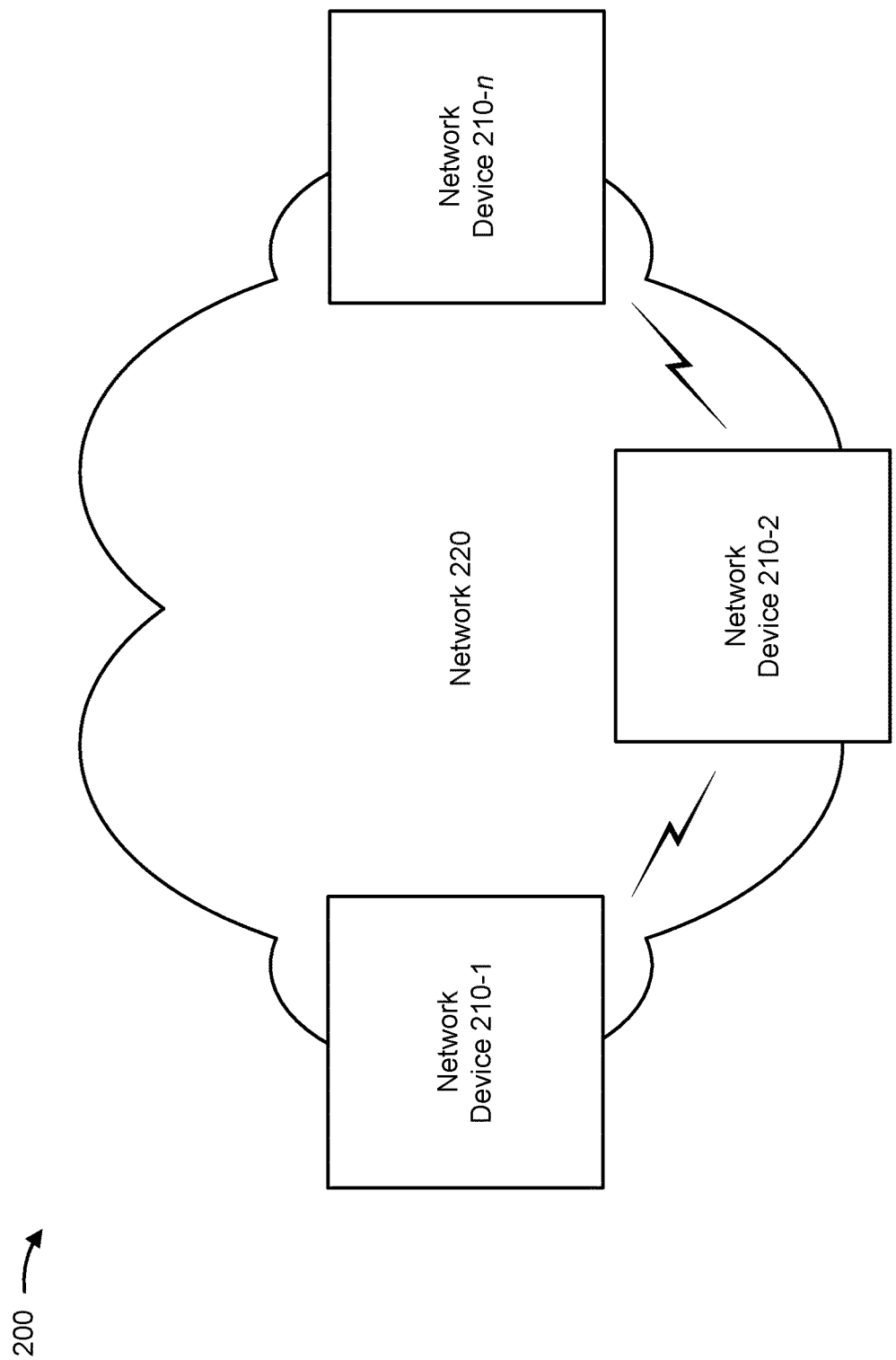
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-n (n≥1) (hereinafter referred to collectively as "network devices 210," and individually as "network device 210") and a network 220. Devices of environment 200 may interconnect via wired connections, wireless connections, or a combination of wired and wireless connections. In some implementations, network devices 210 may be included in an OSPF area.

Network device 210 includes one or more devices capable of receiving, providing, storing, generating, and/or processing information associated with reducing and/or preventing open shortest path first protocol link flapping. In some implementations, network device 210 may include a firewall, a router, a gateway, a switch, a bridge, a wireless access point, a base station (e.g., eNodeB, NodeB, gNodeB, and/or the like), and/or the like. In some implementations, network device 210 may be implemented as a physical device within a housing, such as a chassis. In some implementations, network device 210 may be a virtual device implemented by one or more computer devices of a cloud computing environment or a data center.

In some implementations, a network device 210 may be a neighbor of a neighboring network device 210 in the OSPF area. In some implementations, a network device 210 may establish a fully adjacent link with a neighboring network device 210 in the OSPF area. In some implementations, a network device 210 may reboot, and the network device 210 and a neighboring network device 210 may reestablish a fully adjacent link based on the reboot.

In some implementations, during reestablishment of the fully adjacent link, network devices 210 may exchange database description packets, may exchange one or more link-state request packets and/or link-state update packets to synchronize respective LSDBs, and may transition into a FULL state once the respective LSDBs have been synchronized. In some implementations, during synchronization of LSDBs, the rebooting network device 210 may transmit a database description packet to the non-rebooting network device 210, and the non-rebooting network device 210 may determine that the LSDB of the non-rebooting network device 210 includes an LSA instance associated with the rebooting network device 210. Accordingly, the non-rebooting network device 210 may determine that the LSA instance is old, out of date, and/or not the latest LSA instance associated with the rebooting network device 210, and accordingly may determine to not transmit, to the rebooting network device 210, an LSA instance, associated with the non-rebooting network device 210, that includes information specifying a fully adjacent link between network devices 210 until after the rebooting network device 210 provides an updated and/or latest LSA instance associated with the rebooting network device 210.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of cellular network, etc.), a public land mobile network (PLMN), a LAN, a WAN, a metropolitan area network (MAN), a telephone network (e.g., a public switched telephone network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
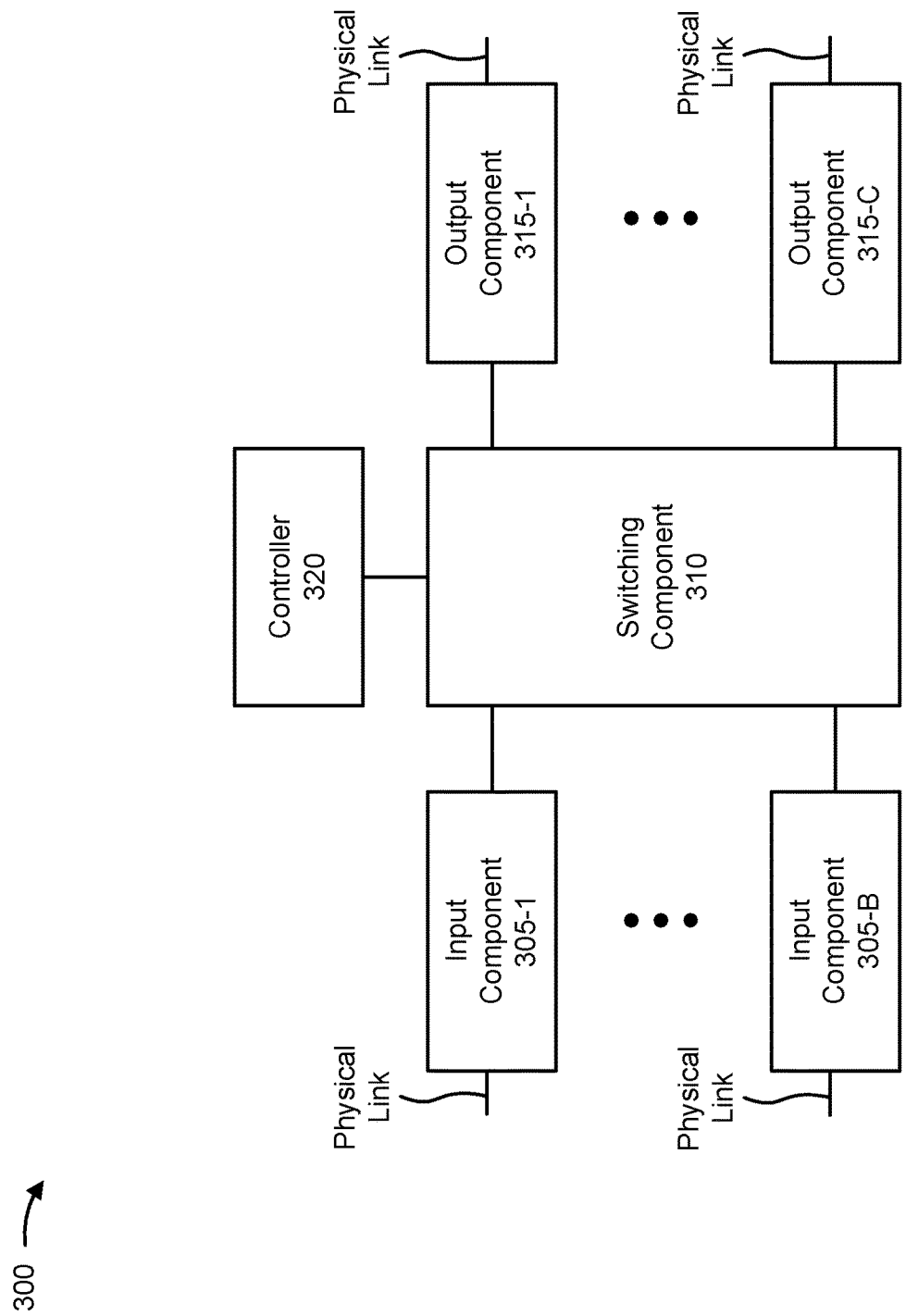
FIG. 3 is a diagram of example components of one or more devices of FIG. 2.

FIG. 3 is a diagram of example components of a device 300. Device 300 may correspond to one or more of network devices 210. In some implementations, one or more of network devices 210 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for reducing open shortest path first protocol link flap. In some implementations, one or more process blocks of FIG. 4 may be performed by a first network device (e.g., network device 210). In some implementations, one or more process blocks of FIG. 4 may be performed by another device or a group of devices separate from or including the first network device, such as one or more other network devices.

As shown in FIG. 4, process 400 may include determining that a link-state database (LSDB), associated with the first network device, includes a first link-state advertisement (LSA) instance associated with a second network device (block 410). For example, the first network device (e.g., using input component 305, switching component 310, output component 315, controller 320, and/or the like) may determine that a link-state database (LSDB), associated with the first network device, includes a first link-state advertisement (LSA) instance associated with a second network device, as described above in connection with FIGS. 1A-1C.

As further shown in FIG. 4, process 400 may include determining that the first network device has not received a second LSA instance, associated with the second network device, that does not include information identifying a fully adjacent link between the second network device and the first network device (block 420). For example, the first network device (e.g., using input component 305, switching component 310, output component 315, controller 320, and/or the like) may determine that the first network device has not received a second LSA instance, associated with the second network device, that does not include information identifying a fully adjacent link between the second network device and the first network device, as described above in connection with FIGS. 1A-1C.

As further shown in FIG. 4, process 400 may include receiving the second LSA instance associated with the second network device (block 430). For example, the first network device (e.g., using input component 305, switching component 310, output component 315, controller 320, and/or the like) may receive the second LSA instance associated with the second network device, as described above in connection with FIGS. 1A-1C.

As further shown in FIG. 4, process 400 may include transmitting, to the second network device, a third LSA instance, associated with the first network device, that includes the information identifying the fully adjacent link between the second network device and the first network device, wherein the third LSA instance is transmitted only after the second LSA instance is received (block 440). For example, the first network device (e.g., using input component 305, switching component 310, output component 315, controller 320, and/or the like) may transmit, to the second network device, a third LSA instance, associated with the first network device, that includes the information identifying the fully adjacent link between the second network device and the first network device, as described above in connection with FIGS. 1A-1C. In some implementations, the third LSA instance is transmitted only after the second LSA instance is received.

Process 400 may include additional implementations, such as any single implementation or any combination of implementations described below and/or in connection with one or more other processes described elsewhere herein.

In some implementations, the first LSA instance, associated with the second network device, includes the information identifying the fully adjacent link between the second network device and the first network device. In some implementations, the first network device may transmit, to the second network device and based on receiving a link-state request, the first LSA instance associated with the second network device, and, when receiving the second LSA instance associated with the second network device, may receive, based on transmitting the first LSA instance associated with the second network device, the second LSA instance associated with the second network device.

In some implementations, the first network device may receive, based on a reboot of the second network device, a database description packet from the second network device, and may determine, based on receiving the database description packet associated with the second network device, that the LSDB, associated with the first network device, includes the first LSA instance associated with the second network device. In some implementations, the first network device may receive, based on transmitting the third LSA instance associated with the first network device, a fourth LSA instance associated with the second network device, wherein the fourth LSA instance includes the information identifying the fully adjacent link between the second network device and the first network device.

In some implementations, the first network device may perform, based on the fourth LSA instance associated with the second network device, one or more shortest path first calculations for one or more routes in an open shortest path first (OSPF) area. In some implementations, a first sequence identifier, associated with the second LSA instance that is associated with the second network device, is greater relative to a second sequence identifier, associated with the first LSA instance that is associated with the second network device, and a third sequence identifier, associated with the fourth LSA instance associated with the second network device, is greater relative to the first sequence identifier, associated with the second LSA instance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for reducing open shortest path first protocol link flap. In some implementations, one or more process blocks of FIG. 5 may be performed by a first network device (e.g., network device 210). In some implementations, one or more process blocks of FIG. 5 may be performed by another device or a group of devices separate from or including the first network device, such as one or more other network devices.

As shown in FIG. 5, process 500 may include determining, based on receiving a database description packet associated with a second network device, that a link-state database (LSDB), associated with the first network device, includes a first link-state advertisement (LSA) instance associated with the second network device, wherein the first LSA instance includes information identifying a fully adjacent link between the first network device and the second network device (block 510). For example, the first network device (e.g., using input component 305, switching component 310, output component 315, controller 320, and/or the like) may determine, based on receiving a database description packet associated with a second network device, that a link-state database (LSDB), associated with the first network device, includes a first link-state advertisement (LSA) instance associated with the second network device, as described above in connection with FIGS. 1A-1C. In some implementations, the first LSA instance includes information identifying a fully adjacent link between the first network device and the second network device.

As shown in FIG. 5, process 500 may include determining that the first network device has not received a second LSA instance, associated with the second network device, that does not include the information identifying the fully adjacent link between the second network device and the first network device (block 520). For example, the first network device (e.g., using input component 305, switching component 310, output component 315, controller 320, and/or the like) may determine that the first network device has not received a second LSA instance, associated with the second network device, that does not include the information identifying the fully adjacent link between the second network device and the first network device, as described above in connection with FIGS. 1A-1C.

As shown in FIG. 5, process 500 may include receiving the second LSA instance associated with the second network device (block 530). For example, the first network device (e.g., using input component 305, switching component 310, output component 315, controller 320, and/or the like) may receive the second LSA instance associated with the second network device, as described above in connection with FIGS. 1A-1C.

As shown in FIG. 5, process 500 may include transmitting, to the second network device, a third LSA instance, associated with the first network device, that includes the information identifying the fully adjacent link between the second network device and the first network device, wherein the third LSA instance is transmitted only after the second LSA instance is received (block 540). For example, the first network device (e.g., using input component 305, switching component 310, output component 315, controller 320, and/or the like) may transmit, to the second network device, a third LSA instance, associated with the first network device, that includes the information identifying the fully adjacent link between the second network device and the first network device, as described above in connection with FIGS. 1A-1C. In some implementations, the third LSA instance is transmitted only after the second LSA instance is received.

Process 500 may include additional implementations, such as any single implementation or any combination of implementations described below and/or in connection with one or more other processes described elsewhere herein.

In some implementations, when determining that the first network device has not received the second LSA instance, the first network device may determine that the first network device has not received the second LSA instance based on determining that another LSDB, associated with the second network device, does not include the first LSA instance associated with the second network device. In some implementations, the first network device may receive, based on a reboot of the second network device, the database description packet from the second network device.

In some implementations, the first network device may receive, from the second network device, a link-state request for the first LSA instance associated with the second network device, may transmit, to the second network device and based on receiving the link-state request, the first LSA instance associated with the second network device, and may receive, based on transmitting the first LSA instance associated with the second network device, the second LSA instance associated with the second network device.

In some implementations, when receiving the link-state request for the first LSA instance associated with the second network device, the first network device may receive the link-state request based on transmitting another database description packet to the second network device. In some implementations, the first network device may receive, based on transmitting the third LSA instance associated with the first network device, a fourth LSA instance associated with the second network device, wherein the fourth LSA instance includes the information identifying the fully adjacent link between the first network device and the second network device, and may perform, based on the fourth LSA instance associated with the second network device, one or more shortest path first calculations for one or more routes in an open shortest path first (OSPF) area.

In some implementations, a first sequence identifier, associated with the second LSA instance associated with the second network device, is greater relative to a second sequence identifier, associated with the first LSA instance associated with the second network device, and a third sequence identifier, associated with the fourth LSA instance associated with the second network device, is greater relative to the first sequence identifier, associated with the second LSA instance associated with the second network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for reducing open shortest path first protocol link flap. In some implementations, one or more process blocks of FIG. 6 may be performed by a first network device (e.g., network device 210). In some implementations, one or more process blocks of FIG. 6 may be performed by another device or a group of devices separate from or including the first network device, such as one or more other network devices.

As shown in FIG. 6, process 600 may include determining that a link-state database (LSDB), associated with the first network device, includes a first link-state advertisement (LSA) instance associated with a second network device (block 610). For example, the first network device (e.g., using input component 305, switching component 310, output component 315, controller 320, and/or the like) may determine that a link-state database (LSDB), associated with the first network device, includes a first link-state advertisement (LSA) instance associated with a second network device, as described above in connection with FIGS. 1A-1C.

As shown in FIG. 6, process 600 may include determining that the first network device has not received a second LSA instance, associated with the second network device, that does not include information identifying a fully adjacent link between the second network device and the first network device (block 620). For example, the first network device (e.g., using input component 305, switching component 310, output component 315, controller 320, and/or the like) may determine that the first network device has not received a second LSA instance, associated with the second network device, that does not include information identifying a fully adjacent link between the second network device and the first network device, as described above in connection with FIGS. 1A-1C.

As shown in FIG. 6, process 600 may include receiving the second LSA instance associated with the second network device (block 630). For example, the first network device (e.g., using input component 305, switching component 310, output component 315, controller 320, and/or the like) may receive the second LSA instance associated with the second network device, as described above in connection with FIGS. 1A-1C.

As shown in FIG. 6, process 600 may include transmitting, to the second network device, a third LSA instance, associated with the first network device, that includes the information identifying the fully adjacent link between the second network device and the first network device, wherein the third LSA instance is transmitted only after the second LSA instance is received (block 640). For example, the first network device (e.g., using input component 305, switching component 310, output component 315, controller 320, and/or the like) may transmit, to the second network device, a third LSA instance, associated with the first network device, that includes the information identifying the fully adjacent link between the second network device and the first network device, as described above in connection with FIGS. 1A-1C. In some implementations, the third LSA instance is transmitted only after the second LSA instance is received.

As shown in FIG. 6, process 600 may include receiving, based on transmitting the third LSA instance associated with the first network device, a fourth LSA instance, associated with the second network device, that includes the information identifying the fully adjacent link between the second network device and the first network device (block 650). For example, the first network device (e.g., using input component 305, switching component 310, output component 315, controller 320, and/or the like) may receive, based on transmitting the third LSA instance associated with the first network device, a fourth LSA instance, associated with the second network device, that includes the information identifying the fully adjacent link between the second network device and the first network device, as described above in connection with FIGS. 1A-1C.

Process 600 may include additional implementations, such as any single implementation or any combination of implementations described below and/or in connection with one or more other processes described elsewhere herein.

In some implementations, the first network device may perform, based on the fourth LSA instance associated with the second network device, one or more shortest path first calculations for one or more routes in an open shortest path first (OSPF) area. In some implementations, a first sequence identifier, associated with the second LSA instance that is associated with the second network device, is greater relative to a second sequence identifier, associated with the first LSA instance that is associated with the second network device, and a third sequence identifier, associated with the fourth LSA instance that is associated with the second network device, is greater relative to the first sequence identifier, associated with the second LSA instance that is associated with the second network device.

In some implementations, the first network device may receive, based on a reboot of the second network device, a database description packet from the second network device, and determine, based on receiving the database description packet associated with the second network device, that the LSDB, associated with the first network device, includes first the LSA instance associated with the second network device.

In some implementations, the first network device may receive, based on a reboot of the second network device, a database description packet from the second network device, may transmit, based on receiving the database description packet, another database description packet to the second network device, may receive, based on transmitting the other database description packet to the second network device, a link-state request for the first LSA instance associated with the second network device, and may transmit, based on receiving the link-state request, the first LSA instance to the second network device, wherein when receiving the second LSA instance associated with the second network device, the first network device may receive the second LSA instance based on transmitting the first LSA instance to the second network device.

In some implementations, the first LSA instance, associated with the second network device, includes the information identifying the fully adjacent link between the first network device and the second network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more memories; and
one or more processors to:
determine that a first link-state database (LSDB), associated with the first network device, includes a first link-state advertisement (LSA) instance associated with a second network device that is not included in a second LSDB associated with the second network device,
wherein the first LSA instance, associated with the second network device, includes out-of-date information based on a reboot of the second network device, and
wherein information identifying contents of the second LSDB, associated with the second network device, is received from the second network device based on the second network device attempting to reestablish a fully adjacent link with the first network device based on the reboot of the second network device;
delay, based on a determination that the first LSA instance, associated with the second network device, includes the out-of-date information, transmission of a second LSA instance, associated with the first network device, that includes information identifying the fully adjacent link between the second network device and the first network device,
wherein the determination that the first LSA instance includes the out-of-date information is based on identification of the contents of the second LSDB associated with the second network device;
determine that the first network device has not received a third LSA instance, associated with the second network device, that does not include the information identifying the fully adjacent link between the second network device and the first network device;
generate a database description packet including information identifying the contents of the first LSDB associated with the first network device that does not identify the second LSA instance associated with the first network device;
transmit, to the second network device, the database description packet;
receive the third LSA instance associated with the second network device; and
transmit, to the second network device, the second LSA instance, associated with the first network device, that includes the information identifying the fully adjacent link between the second network device and the first network device,
wherein the second LSA instance, associated with the first network device, is transmitted only after the third LSA instance, associated with the second network device, is received.

2. The first network device of claim 1, wherein the first LSA instance, associated with the second network device, includes the information identifying the fully adjacent link between the second network device and the first network device.

3. The first network device of claim 1, wherein the one or more processors are further to:
transmit, to the second network device and based on receiving a link-state request, the first LSA instance associated with the second network device,
wherein the one or more processors, when receiving the third LSA instance associated with the second network device, are to:
receive, based on transmitting the first LSA instance associated with the second network device, the third LSA instance associated with the second network device.

4. The first network device of claim 1, wherein the one or more processors are further to:
receive, based on a reboot of the second network device, a database description packet from the second network device; and
determine, based on receiving the database description packet associated with the second network device, that the first LSDB, associated with the first network device, includes the first LSA instance associated with the second network device.

5. The first network device of claim 1, wherein the one or more processors are further to:
receive, based on transmitting the second LSA instance associated with the first network device, a fourth LSA instance associated with the second network device,
wherein the fourth LSA instance, associated with the second network device, includes the information identifying the fully adjacent link between the second network device and the first network device.

6. The first network device of claim 5, wherein the one or more processors are further to:
perform, based on the fourth LSA instance associated with the second network device, one or more shortest path first calculations for one or more routes in an open shortest path first (OSPF) area.

7. The first network device of claim 5, wherein a first sequence identifier, associated with the third LSA instance that is associated with the second network device, is greater relative to a second sequence identifier, associated with the first LSA instance that is associated with the second network device; and
wherein a third sequence identifier, associated with the fourth LSA instance associated with the second network device, is greater relative to the first sequence identifier, associated with the third LSA instance.

8. A non-transitory computer-readable medium storing instructions, the instructions comprising:
one or more instructions that, when executed by one or more processors of a first network device, cause the one or more processors to:
determine, based on receiving a database description packet associated with a second network device, that a first link-state database (LSDB), associated with the first network device, includes a first link-state advertisement (LSA) instance associated with the second network device that is not included in a second LSDB associated with the second network device,
wherein the first LSA instance, associated with the second network device, includes out-of-date information, based on a reboot of the second network device, that includes information identifying a fully adjacent link between the first network device and the second network device, and
wherein the database description packet identifies contents of the second LSDB associated with the second network device;
delay, based on a determination that the first LSA instance, associated with the second network device, includes the out-of-date information, transmission of a second LSA instance, associated with the first network device, that includes the information identifying the fully adjacent link between the second network device and the first network device,
wherein the determination that the first LSA instance includes the out-of-date information is based on identification of the contents of the second LSDB associated with the second network device;
determine that the first network device has not received a third LSA instance, associated with the second network device, that does not include the information identifying the fully adjacent link between the second network device and the first network device;
generate another database description packet including information identifying the contents of the first LSDB associated with the first network device that does not identify the second LSA instance associated with the first network device;
transmit, to the second network device, the other database description packet;
receive the third LSA instance associated with the second network device; and
transmit, to the second network device, the second LSA instance, associated with the first network device, that includes the information identifying the fully adjacent link between the second network device and the first network device,
wherein the second LSA instance, associated with the first network device, is transmitted only after the third LSA instance, associated with the second network device, is received.

9. The non-transitory computer-readable medium of claim 8, wherein the one or more instructions, that cause the one or more processors to determine that the first network device has not received the third LSA instance, associated with the second network device, cause the one or more processors to:
determine that the first network device has not received the third LSA instance, associated with the second network device, based on determining that the second LSDB, associated with the second network device, does not include the first LSA instance associated with the second network device.

10. The non-transitory computer-readable medium of claim 8, wherein the one or more instructions, when executed by the one or more processors, further cause the one or more processors to:
receive, based on a reboot of the second network device, the database description packet from the second network device.

11. The non-transitory computer-readable medium of claim 8, wherein the one or more instructions, when executed by the one or more processors, further cause the one or more processors to:
receive, from the second network device, a link-state request for the first LSA instance associated with the second network device;
transmit, to the second network device and based on receiving the link-state request, the first LSA instance associated with the second network device; and
receive, based on transmitting the first LSA instance associated with the second network device, the third LSA instance, associated with the second network device.

12. The non-transitory computer-readable medium of claim 11, wherein the one or more instructions, that cause the one or more processors to receive the link-state request for the first LSA instance associated with the second network device, cause the one or more processors to:
receive the link-state request based on transmitting another database description packet to the second network device.

13. The non-transitory computer-readable medium of claim 8, wherein the one or more instructions, when executed by the one or more processors, further cause the one or more processors to:
receive, based on transmitting the second LSA instance associated with the first network device, a fourth LSA instance associated with the second network device,
wherein the fourth LSA instance, associated with the second network device, includes the information identifying the fully adjacent link between the first network device and the second network device; and
perform, based on the fourth LSA instance associated with the second network device, one or more shortest path first calculations for one or more routes in an open shortest path first (OSPF) area.

14. The non-transitory computer-readable medium of claim 13, wherein a first sequence identifier, associated with the third LSA instance associated with the second network device, is greater relative to a second sequence identifier, associated with the first LSA instance associated with the second network device; and
wherein a third sequence identifier, associated with the fourth LSA instance associated with the second network device, is greater relative to the first sequence identifier, associated with the third LSA instance associated with the second network device.

15. A method, comprising:
determining, by a first network device, that a first link-state database (LSDB), associated with the first network device, includes a first link-state advertisement (LSA) instance associated with a second network device that is not included in a second LSDB associated with the second network device,
wherein the first LSA instance, associated with the second network device, includes out-of-date information based on a reboot of the second network device, and wherein information identifying contents of the second LSDB, associated with the second network device, is received from the second network device based on the second network device attempting to reestablish a fully adjacent link with the first network device based on the reboot of the second network device;

delaying, by the first network device and based on a determination that the first LSA instance, associated with the second network device, includes the out-of-date information, transmission of a second LSA instance, associated with the first network device, that includes information identifying the fully adjacent link between the second network device and the first network device;

determining, by the first network device, that the first network device has not received a third LSA instance, associated with the second network device, that does not include the information identifying a fully adjacent link between the second network device and the first network device;

generating, by the first network device, a database description packet including information identifying the contents of the first LSDB associated with the first network device that does not identify the second LSA instance associated with the first network device;

transmitting, by the first network device and to the second network device, the database description packet;

wherein the determination that the first LSA instance includes the out-of-date information is based on identifying contents of a second LSDB associated with the second network device;

receiving, at the first network device, the third LSA instance associated with a third network device;

transmitting, by the first network device and to the second network device, the second LSA instance, associated with the first network device, that includes the information identifying the fully adjacent link between the second network device and the first network device, wherein the second LSA instance, associated with the first network device, is transmitted only after the third LSA instance, associated with the third network device, is received; and receiving, at the first network device and based on transmitting the second LSA instance associated with the first network device, a fourth LSA instance, associated with the second network device, that includes the information identifying the fully adjacent link between the second network device and the first network device.

16. The method of claim 15, further comprising:

performing, based on the fourth LSA instance associated with the second network device, one or more shortest path first calculations for one or more routes in an open shortest path first (OSPF) area.

17. The method of claim 15, wherein a first sequence identifier, associated with the third LSA instance that is associated with the second network device, is greater relative to a second sequence identifier, associated with the first LSA instance that is associated with the second network device; and wherein a third sequence identifier, associated with the fourth LSA instance that is associated with the second network device, is greater relative to the first sequence identifier, associated with the third LSA instance that is associated with the second network device.

18. The method of claim 15, further comprising:

receiving, based on a reboot of the second network device, a database description packet from the second network device; and determining, based on receiving the database description packet associated with the second network device, that the first LSDB, associated with the first network device, includes the first LSA instance associated with the second network device.

19. The method of claim 15, further comprising:

receiving, based on a reboot of the second network device, a database description packet from the second network device;

transmitting, based on receiving the database description packet, another database description packet to the second network device;

receiving, based on transmitting the other database description packet to the second network device, a link-state request for the first LSA instance associated with the second network device; and transmitting, based on receiving the link-state request, the first LSA instance to the second network device, wherein receiving the third LSA instance associated with the second network device comprises:

receiving the third LSA instance, associated with the second network device, based on transmitting the first LSA instance to the second network device.

20. The method of claim 15, wherein the first LSA instance, associated with the second network device, includes the information identifying the fully adjacent link between the first network device and the second network device.

* * * * *